US012657161B1

(12) United States Patent　　(10) Patent No.:　　US 12,657,161 B1
Weiss et al.　　　　　　　　　　(45) Date of Patent:　　Jun. 16, 2026

(54) HORIZONTALLY SCALABLE MULTI-DIMENSIONAL ANALYSIS ARCHITECTURE

(71) Applicant: JDA Software Group, Inc., Scottsdale, AZ (US)

(72) Inventors: Steven R. Weiss, Ann Arbor, MI (US); Steve Pawlish, North Potomac, MD (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 478 days.

(21) Appl. No.: 15/446,730

(22) Filed: Mar. 1, 2017

(51) Int. Cl.
　　*G06F 16/172* 　　　(2019.01)
(52) U.S. Cl.
　　CPC ................................. *G06F 16/172* (2019.01)
(58) Field of Classification Search
　　CPC ..... G06F 9/466; G06F 16/172; G06F 16/1844
　　USPC ........................................................ 707/607
　　See application file for complete search history.

(56) References Cited

U.S. PATENT DOCUMENTS

| | | | | |
|---|---|---|---|---|
| 8,620,635 B2 * | 12/2013 | Rubin | .................... | G06F 30/00 |
| | | | | 703/2 |
| 2004/0181518 A1 * | 9/2004 | Mayo | .................... | G06F 16/283 |
| 2012/0136842 A1 * | 5/2012 | Zhu | .................... | G06F 16/1748 |
| | | | | 707/692 |
| 2012/0284459 A1 * | 11/2012 | Gill | .................... | G06F 12/0866 |
| | | | | 711/113 |
| 2016/0380883 A1 * | 12/2016 | Shaw | .................... | H04L 41/509 |
| | | | | 370/254 |
| 2017/0103116 A1 * | 4/2017 | Hu | ........................ | G06F 16/213 |

* cited by examiner

*Primary Examiner* — Allen S Lin
(74) *Attorney, Agent, or Firm* — Spencer Fane LLP; Steven J. Laureanti

(57) ABSTRACT

A system and method are disclosed including a distributed computer network having one or more application servers and one or more data nodes. The one or more data nodes each include a shard of data representing a measure. The one or more application servers receive a measure model and an edit to the measure. The one or more application servers append the edit to a register and generate a calculation sequence. The one or more application servers further disaggregate one or more values to a shard of data on the one or more data nodes based, at least in part, on the edited measure and calculate one or more unedited measures based, at least in part, on the disaggregation.

9 Claims, 5 Drawing Sheets

HORIZONTALLY SCALABLE MULTI-DIMENSIONAL ANALYSIS ARCHITECTURE

TECHNICAL FIELD

The present disclosure relates generally to a horizontally scalable distributed architecture and specifically to a high-performance, horizontally-scalable, multi-user, multi-dimensional data storage system and ad-hoc aggregation engine.

BACKGROUND

Online Analytical Processing (OLAP) database architectures exist which can provide reasonably fast consolidation of data in some cases, but these systems require data to be pre-aggregated to pre-selected levels and attributes for consolidation, which disallows ad-hoc consolidations and prevents quick modifications of data. NoSQL and NewSQL (Structured Query Language) database architectures also exist, but these lack planning-specific calculations and function inversion. This lack of features is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
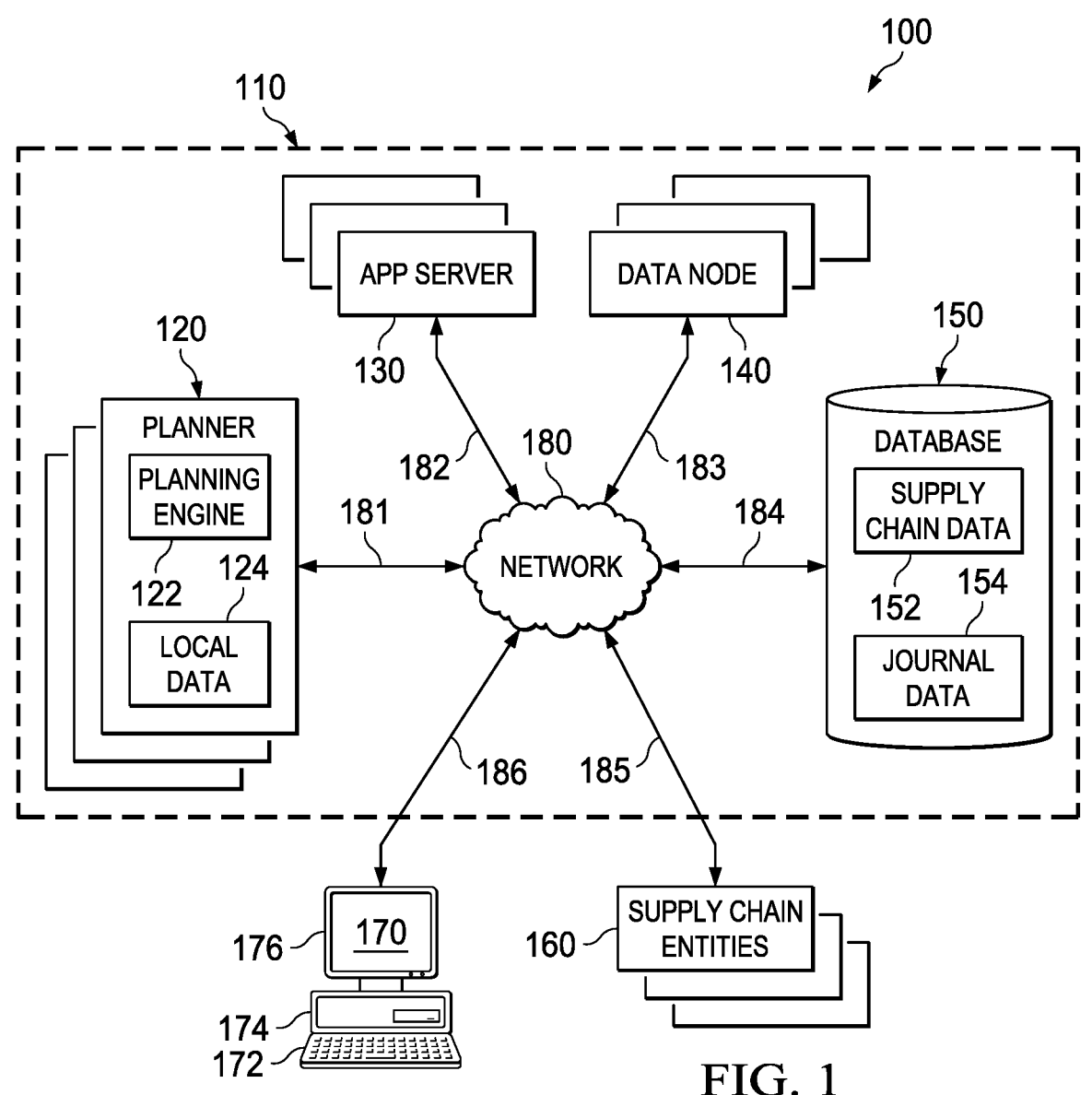
FIG. 1 illustrates a distributed network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to a distributed network comprising a high-performance and horizontally-scalable architecture. Embodiments of the distributed network comprise one or more application servers that distribute the storage of large-scale multi-dimensional data across multiple data nodes while simultaneously allowing quick access, manipulation, and calculation of the data in an ad-hoc manner by one or more planners. In addition, or as an alternative, the current disclosure provides one or more planners the ability to view and modify data across an entire enterprise using multi-path calculations without pre-aggregation. For purposes of this disclosure, a multi-path calculation comprises a calculation of data measures that can be driven in multiple directions depending on several factors, as explained in more detail below.

FIG. 1 illustrates an exemplary distributed network 100, according to a first embodiment. Distributed network 100 comprises distributed horizontally-scalable network 110, one or more supply chain entities 160 and a computer 170. Distributed horizontally-scalable network 110 comprises one or more planners 120, one or more application servers 130, one or more data nodes 140, a database 150, a network 180, and communication links 181, 182, 183, 184, 185, and 186. Distributed horizontally-scalable network 110 will be discussed in more detail in connection with FIG. 2. Although one or more planners 120, one or more application servers 130, one or more data nodes 140, a single database 150, one or more supply chain entities 160, a single computer 170, and a single network 180, are shown and described; embodiments contemplate any number of planners 120, application servers 130, data nodes 140, databases 150, supply chain entities 160, computers 170, and networks 180, according to particular needs.

One or more planners 120 comprise planning engine 122 and local data 124, and any software or hardware configured to display and modify data stored at one or more data nodes 140 or database 150. Planning engine 122, which may comprise an application for supply chain management, retail, manufacturing, enterprise, or utility planning, including any applet such as a pivot table, workbench, worksheet, or the like. For example, editing a value in a pivot table may automatically generate a request to an application server 130 to perform an aggregation, disaggregation, or calculation based on the edited value. Such values may comprise, for example, average sales, unit cost, margin, and revenue across various periods for one or more products. In one embodiment, editing a value will initiate a disaggregation process, which is accompanied by a calculation process, and is followed by an aggregation process to refresh the displayed data. Local data 124, which may include any data necessary for local calculations or planning by one or more planners 120.

In one embodiment, one or more planners 120 comprise any suitable software or hardware that interfaces with one or more application servers 130 and are capable of storing, receiving, processing, communicating, and modifying data stored at one or more data nodes 140 or database 150. In addition, these one or more data nodes 140 and database 150 may comprise any physical or virtual server, and any supporting hardware or software, supporting the storage of data at one or more locations local to, or remote from, the one or more planners 120 and one or more application servers 130.

In other embodiments, one or more planners 120 store, receive, process, communicate, and modify data at the one or more data nodes 140 and/or database 150 for supply chain management, inventory optimization, or retail, manufacturing, enterprise, or utility planning. One or more planners 120 may include applications, such as, for example, a pivot table, workbench, worksheet, or the like, for accessing or modifying such data. Such data may be associated with one or more field-customizable sets of measures.

According to embodiments, one or more application servers 130 and one or more data nodes 140 improve the scalability and performance over previous computer network architectures. For example, and as explained in more detail in connection with FIG. 2, one or more application servers 130 provides an interface for one or more users to make requests to aggregate, disaggregate, or perform calculations on data stored on one or more data nodes 140. Aggregation, disaggregation, and calculations performed on data (and any associated metadata) are improved by dividing the data into shards, such that an entire data set may be stored on a single data node 140 or the data could be split into shards stored on multiple data nodes 140.

As an example only and not by way of limitation, shards comprise a horizontal partition of large-scale data. For example, enterprise data for a national retailer may partition the total data for the enterprise by dividing the total enterprise data into shards, with each shard being associated with a particular store, region, or combination. Each shard of data may be stored on a separate data node 140, wherein each data node 140 may also be associated with a particular store or region. Several examples of particular partitioning schemes for distributing shards across the one or more data nodes 140 are described in detail below. However, embodiments contemplate the horizontal partitioning of data into shards may be based on any suitable partitioning scheme, such as, for example, partitioning based on product-type, geography, or any combination of dimensions associated with the data.

Database 150 comprises one or more databases or other data storage arrangements at one or more locations, local to, or remote from, one or more planners 120, one or more application servers 130, one or more data nodes 140, one or more supply chain entities 160, and computer 170. Database 150 comprises supply chain data 152 and journal data 154. Supply chain data 152 may comprise, for example, metadata, which is comprised of dimensions, hierarchies, levels, members, attributes, and member attribute values, and fact data, comprising measure values for combinations of members. Data stored in database 150 may be, for example, various decision variables, business constraints, goals and objectives of one or more supply chain entities 160.

According to an embodiment, journal data 154 may comprise changes made to data in memory of one or more data nodes 140 that is stored by a journaling process on one or more application servers 130. Embodiments also provide for journaling on each data node 140. The journaling process saves changes made to, for example, live data store of the one or more data nodes 140, such that each of the one or more data nodes 140 writes its portion of altered values to journal data 154 on database 150. The collected journals of all of the one or more data nodes 140 may be replayed at a later time as updates to supply chain data 152 on database 150. Writing data as journal data 154 is much faster than altering the values in supply chain data 152.

One or more supply chain entities 160 represent one or more entities of a supply chain network, such as, for example, suppliers, manufacturers, distribution centers, retailers, and/or customers. A supplier may be any suitable entity that offers to sell or otherwise provides one or more items (i.e., materials, components, or products) to one or more manufacturers. Such suppliers may comprise automated distribution systems that automatically transport products to one or more manufacturers based, at least in part, on a production plan determined by the one or more planners 120. In addition, or as an alternative, each of the one or more items may be represented by an identifier, including, for example, Stock-Keeping Unit (SKU) or Universal Product Code (UPC) information.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another supply chain entity in distributed network 100, such as a retailer, an item that needs further processing, or any other item. A manufacturer may, for example, produce and sell a product to a supplier, another manufacturer, a distribution center, retailer, a customer, or any other suitable person or entity. Such manufacturers may comprise automated robotic production machinery that produce products based, at least in part, on a production plan determined by the one or more planners 120.

A distribution center may be any suitable entity that offers to store or otherwise distributes at least one product to one or more retailers and/or customers. A distribution center may, for example, receive a product from another entity in the supply chain network and store and transport the product for another supply chain entity. Such distribution centers may comprise automated warehousing systems that automatically remove products from and place products into inventory based, at least in part, on a production plan determined by one or more planners 120.

A retailer may be any suitable entity that obtains one or more products to sell to one or more customers. Although one or more supply chain entities 160 is shown and described as separate and distinct entities, the same entity may simultaneously act as any one of the one or more supply chain entities 160. For example, one or more supply chain entities 160 acting as a manufacturer can produce a product, and the same entity can act as a supplier to supply an item to itself or another supply chain entity 160. Although one example of a supply chain network is shown and described, embodiments contemplate any operational environment and/or supply chain network, without departing from the scope described herein.

Distributed network 100 may operate on one or more computers 170 that are integral to or separate from the hardware and/or software that support one or more planners 120, one or more application servers 130, one or more data nodes 140, and one or more supply chain entities 160. Computers 170 may include any suitable input device 172, such as a keypad, mouse, tablet, mobile, touch screen, microphone, or other device to input information. An output device 176 may convey information associated with the operation of distributed network 100, including digital or analog data, visual information, or audio information. Computers 170 may include fixed or removable non-transitory computer-readable storage media, such as magnetic computer disks, CD-ROM, or other suitable non-transitory computer-readable storage media to receive output from and provide input to distributed network 100. Computers 170 may include one or more processors 174 and associated memory to execute instructions and store, access, retrieve, and manipulate information according to the operation of distributed network 100.

Although a single computer 170 is shown and described in FIG. 1, one or more planners 120, one or more application servers 130, one or more data nodes 140, and one or more supply chain entities 160 may each operate on separate computers 170 or may operate on one or more shared computers 170. Each of the one or more computers 170 may be a work station, personal computer (PC), network computer, tablet, notebook computer, personal digital assistant (PDA), cell phone, smartphone, telephone, wireless data port, or any other suitable computing device. In an embodiment, one or more users may be associated with one or more planners 120. These one or more users may include, for example, a "manager" or a "planner" handling manufacturing or retail planning, utility systems management, enterprise planning, and/or one or more related tasks within distributed network 100. In addition, or as an alternative, these one or more users within distributed network 100 may include, for example, one or more computers 170 programmed to autonomously handle, among other things, manufacturing equipment, adjusting inventory levels at various stocking points and distribution centers, adjusting resource allotment or distribution at a utility system, and/or one or more related tasks within distributed network 100.

In one embodiment, one or more planners 120 are coupled with network 180 using communications link 181, which may be any wireline, wireless, or other link suitable to support data communications between one or more planners 120 and network 180 during operation of distributed network 100. One or more application servers 130 may be coupled with network 180 using communications link 182, which may be any wireline, wireless, or other link suitable to support data communications between one or more application servers 130 and network 180 during operation of distributed network 100. One or more data nodes 140 may be coupled with network 180 using communications link 183, which may be any wireline, wireless, or other link suitable to support data communications between one or more data nodes 140 and network 180 during operation of distributed network 100. Database 150 may be coupled with network 180 using communications link 184, which may be any wireline, wireless, or other link suitable to support data communications between database 150 and network 180 during operation of distributed network 100. One or more supply chain entities 160 may be coupled with network 180 using communications link 185, which may be any wireline, wireless, or other link suitable to support data communications between one or more supply chain entities 160 and network 180 during operation of distributed network 100. One or more computers 170 may be coupled with network 180 using communications link 186, which may be any wireline, wireless, or other link suitable to support data communications between one or more computers 170 and network 180 during operation of distributed network 100.

Figure 2:
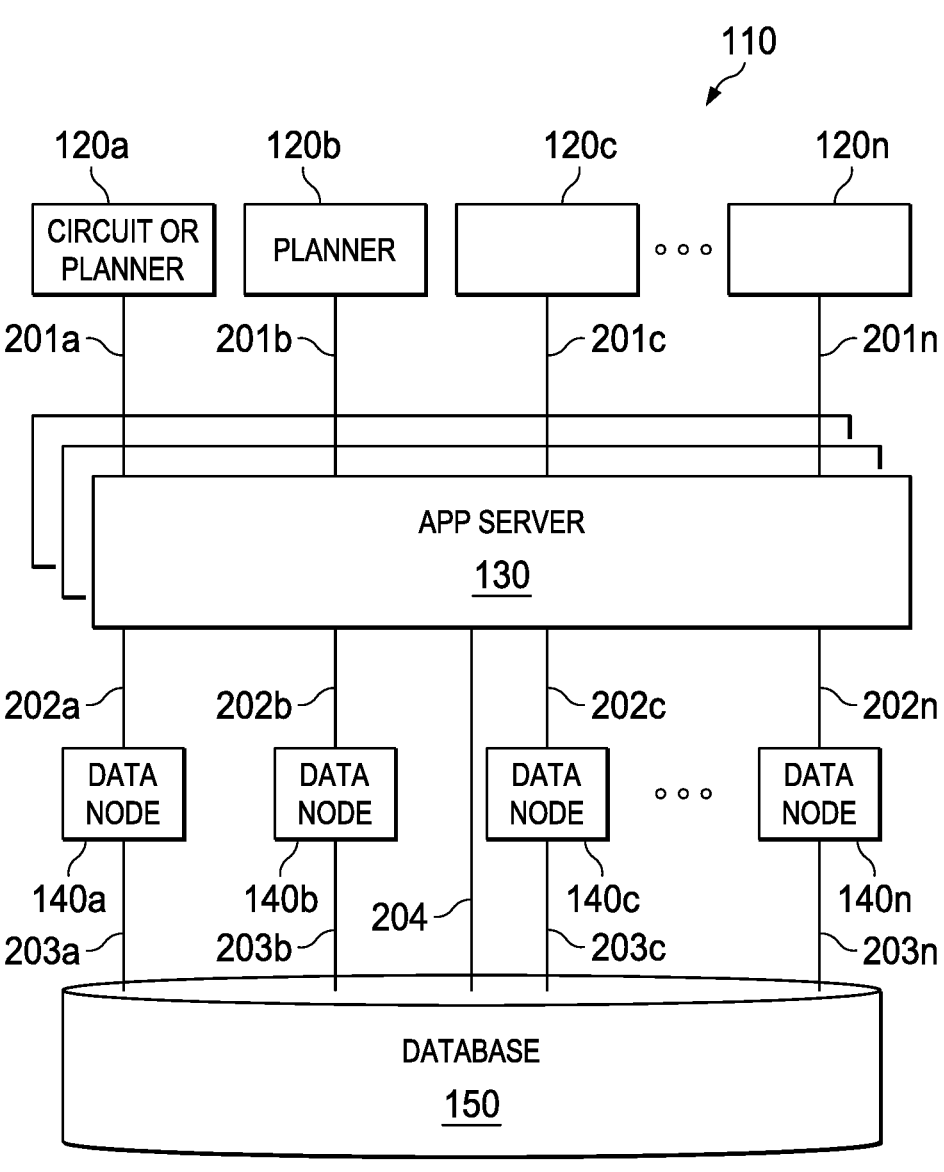
FIG. 2 illustrates the distributed horizontally-scalable network of FIG. 1 according to an embodiment.

Although communication links 181, 182, 183, 184, 185, and 186 are shown as generally coupling one or more planners 120, one or more application servers 130, one or more data nodes 140, database 150, one or more supply chain entities 160, and computers 170 to network 180; each of one or more planners 120, one or more application servers 130, one or more data nodes 140, database 150, one or more supply chain entities 160, and computers 170 may communicate directly with each other, according to particular needs and as discussed below in FIG. 2.

In another embodiment, network 180 includes the Internet and any appropriate local area networks (LANs), metropolitan area networks (MANs), or wide area networks (WANs) coupling one or more planners 120, one or more application servers 130, one or more data nodes 140, database 150, one or more supply chain entities 160, and computers 170. For example, data may be maintained by locally or externally of one or more planners 120, one or more application servers 130, one or more data nodes 140, database 150, one or more supply chain entities 160, and computers 170 and made available to one or more associated users of one or more supply chain entities 160 using network 180 or in any other appropriate manner. Those skilled in the art will recognize that the complete structure and operation of communication network 180 and other components within distributed network 100 are not depicted or described. Embodiments may be employed in conjunction with known communications networks and other components.

FIG. 2 illustrates the distributed horizontally-scalable network 110 of FIG. 1, in accordance with an embodiment. As discussed above, distributed horizontally-scalable network 110 comprises one or more planners 120, one or more application servers 130, one or more data nodes 140, and database 150. As discussed in more detail below, distributed horizontally-scalable network 110 of FIG. 2 illustrates an exemplary alternative view of the configuration of FIG. 1 between one or more planners 120, one or more application servers 130, one or more data nodes 140, and database 150. Although illustrated in a distributed linear fashion, communication between one or more planners 120 (120a-n), one or more application servers 130, one or more data nodes 140 (140a-n), and database 150 may be coupled through any networked communication link 181-186 and/or network 180 of FIG. 1, or by any direct communication links 201a-n, 202a-n 203a-n, and 204, as illustrated in FIG. 2.

In addition, or as an alternative, although distributed horizontally-scalable network 110 is illustrated as comprising one or more planners 120, one or more application servers 130, one or more data nodes 140a-140n, and a single database, embodiments contemplate any suitable number, structure, or arrangement of planners, application servers, nodes, and databases, according to particular needs. For example, increasing the number of application servers 130, including a cluster of application servers 130, improves managing processing load from multiple users, which may provide increased scalability of user-load.

Similarly, embodiments contemplate any number of data nodes 140 according to particular needs. For example, the number of data nodes 140 may depend on the scale of the data, the amount of available memory on each data node 140, the performance expectations of one or more planners 120 as well as the availability of hardware to support each data node 140. The number of data nodes 140 is often quite large, and may number in the hundreds for a large database.

As described above, one or more planners 120 may use one or more application servers 130 as a gateway to store and access data stored as shards on one or more data nodes 140. The distribution of the data between each data node 140 may be sharded by a predetermined partitioning scheme or sharding strategy. In one embodiment, the partitioning scheme for sharding data on the one or more data nodes 140 comprises storing a shard of data representing a single geographical location on a single data node 140. For example, a single data node 140 may store a shard representing data relating to a particular geographical region in the geography dimension, such as a particular store, state, locale, region, or other organization of locations. In addition, or as an alternative, each of the one or more data nodes 140 may store a shard representing data relating to a particular product or product component, customer, or any other dimension or attribute of data.

According to embodiments, a partitioning scheme is programmed into each data node 140, and is flexible in respect to how it may assign data for different dimension members and combinations to specified data nodes 140*a-n*. For example, the partitioning scheme may keep measures for the same members grouped on the same nodes 140*a-n*, so that calculations may be performed on a node 140 in isolation from other nodes 140*a-n*. The partitioning scheme keeps data for different time periods on the same node 140, so that some built-in functions that navigate to different time members can still function without being concerned that the required data may be stored on a different node 140.

Based, at least in part, on the partitioning scheme, application server 130 may map any combination of members of dimensions to a particular data node 140 or to a collection of such nodes 140*a-n*. However, according to some embodiments, application server 130 does not allow measures or members of the time dimension to be used to make this determination. Therefore, according to this embodiment, for any combination of members of other dimensions where some data is loaded onto one or more data nodes 140*a-n*, all measures and all time periods will be present on that particular data node 140. This may ensure that relationships between measures may be calculated by a data node 140 without requiring assistance from other data nodes 140*a-n* and that calculations requiring iterating over time can be performed on a single data 140 node as well.

Additionally, the partitioning scheme provides for a navigational round-trip, when needed, so that built-in functions that navigate in other dimensions, such as the ability to calculate a percentage of a parent or ancestor member, may be performed without knowing all the required parentage relationships on application server 130.

For example, some functions used to describe relationships between measures may require access to data for related members. This may include, for example, the sales for a parent member in a product dimension. Since the values for the sales (or other related measure) of the parent may require aggregation by other data nodes 140, application server 130 may first determine the members for which the aggregation is required. This may require asking the data nodes 140*a-n* as a group for the relational information (to navigate from a member to its parent, for example), which is not necessarily present on all data nodes, and usually not present on the application server 130.

Although distributed horizontally-scalable network 110 is described as agnostic to the type of data stored on the one or more data nodes 140, it may be desirable to generate and/or analyze information regarding sales, demand, supply, selling price, or other data concerning a product or other item. Such business or planning environment data may comprise facts. Facts are data that may represent an event associated with a business or planning process and contain the measurement data associated with that event. Each fact may comprise the value of a measure for members of one or more dimensions.

Dimensions comprise dimension levels, each of which comprises dimension members, where each fact has a value for various member combinations. Commonly used dimensions include channel, key customers, product, geography, and time. Such dimensions may provide structured labeling information to otherwise unordered numeric measures. Measures are any property of data on which a calculation may be made. As an example only and not by way of limitation, the measures stored in the one or more data nodes 140 and/or database 150 may include actual sales, forecasted sales, actual demand, forecasted demand, available supply, selling price, or any other quantifiable data measures associated with a particular product, item, other dimension member, or combination of the foregoing.

Figure 3:
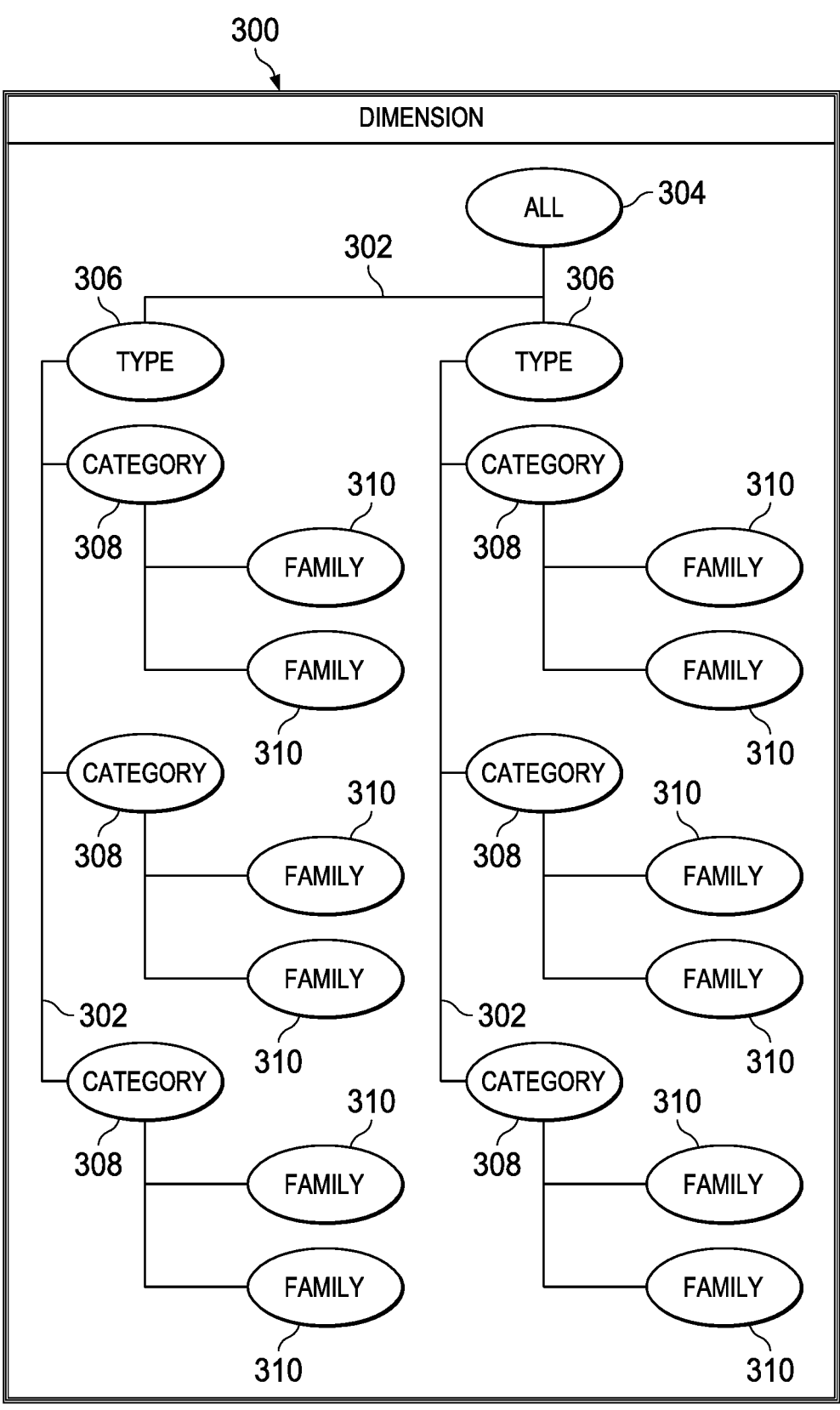
FIG. 3 illustrates an exemplary dimension that includes a hierarchy of product levels each having one or more members.

To further explain the facts, dimensions and measures, an example is now given in FIG. 3, which illustrates an exemplary dimension 300 that includes a hierarchy of levels each having one or more members 304-310. Although one example hierarchy is illustrated, it should be understood that a dimension may have multiple alternative hierarchies. The value of each measure associated with a member 304-310 may be an aggregation of the values of corresponding data measures associated with hierarchically related members 304-310 in lower levels of dimension 300. In an example embodiment in which distributed network 100 provides sales forecasts, the sales associated with a member 304-310 is the aggregate sales for these hierarchically related members 304-310 in lower levels of dimension 300. In the illustrated embodiment, levels for dimension 300 include an all level 304, a type level 306, a category level 308, and a family level 310. For the type level 306 there are two members, for the category level 308 there are six members, and for the family level 310 there are twelve members. Although a particular number of type levels, category levels and family are shown and described; embodiments contemplate any number of levels, according to particular needs. In addition, exemplary hierarchical relationships between members 304-310 are shown using links 302, as described more fully below. Links 302 between hierarchically related members 304-310 in adjacent levels of dimension 300 reflect parent-child relationships between members 304-310.

As an example only and not by way of limitation, dimension 300 may be a product dimension, such as, for a national retailer, as discussed in the above. In this example, a product dimension 300 may comprise a type level 306, which includes "Hardware" and "Tools" members 306. "Hardware" member 306 represents the aggregate sales for hierarchically related members 308-310 below "Hardware" member 304-310 in levels 308 and 310. Similarly, "Tools" member 306 represents the aggregate sales for hierarchically related members 308-310 below "Tools" member 304-310. Links 302 between "All" member 304 and "Hardware" and "Tools" members 306 indicate the hierarchical relationships between these members.

Category level 308 includes, under "Hardware" member 306, "Screws," "Nails," and "Bolts" members. "Screws" member 308 represents the aggregate sales for hierarchically related members 310 below "Screws". Similarly, "Nails" member 308 represents aggregate sales for hierarchically related members 310 below "Nails" and "Bolts" member 308 represents the aggregate sales for hierarchically related members 310. Links 302 between "Hardware" member and "Screws," "Nails," and "Bolts" members indicate the hierarchical relationships between these members. Analogous links 302 reflect hierarchical relationships between "Tools" members of type level 306 and corresponding members in lower family levels 310.

Family level 310 includes, under "Screws" member 308, "#8" and "#10". Links 302 between "Screws" member 308 and "#8" and "#10" members 310 indicate hierarchical relationships between these members 304. Although no links 302 are shown between members in family level 310 and possible lower levels, such further levels may exist within dimension 300 and analogous links 302 may exist to reflect the corresponding hierarchical relationships. Furthermore, members 304-310 shown in FIG. 3 are example only and are not intended to be an exhaustive set of all possible members 304-310. Those skilled in the art will appreciate that other suitable members 304-10 and associated links 302 may exist.

As described above, the measures associated with each member 304-310 may comprise an aggregation of the data measures associated with some or all members 306-310 in lower levels within the same hierarchy of parent-child links 302. Therefore, given forecast data for a member (a parent) at one level the forecasts for each of the related members in the next lowest level (the children of the parent) may be determined by disaggregating the forecast data for the parent between the children. Furthermore, although the terms "parent" and "children" are used above to identify a relationship between members 304-310 of a single dimension 300, these terms may also be used to refer to the relationship between measures or values associated with a member from each of a number of dimensions. Although an example is described in connection with sales relationships, the following description is similarly applicable to other data relationships, such as demand, available supply, selling price, or any other relationships relating to measures associated with an item or set of items.

As another example, and not by way of limitation, a location dimension 300 may comprise a type level 306 including the member "Region." The "Region" member may comprise category level 308 including the members "East Coast," "West Coast," "Midwest Region," and "South Region." Each member of the category level 308 may comprise any number of one or more stores associated with a retailer. One or more application servers 130 and/or one or more data nodes 140 may use this exemplary hierarchy to determine how to aggregate and disaggregate measures associated with members of the hierarchy. According to embodiments, aggregation and disaggregation is performed primarily by the data nodes 140a-n. For aggregation, each data node 140a-n may supply an application server 130 that is making an aggregation request with a partial aggregation, and the application server 130 may complete the aggregation process by merging the partial aggregations from the one or more data nodes 140. According to embodiments, disaggregation is also performed primarily by the data nodes 140a-n, as requested by an application server 130. One or more application servers 130 and/or one or more data nodes 140 may also use this exemplary hierarchy to determine how to shard data across the one or more data nodes 140.

As an example only and not by way of limitation, one or more application servers 130 may aggregate measures for all stores in the East Coast Region when, for example, the one or more planners 120 modifies a value of a measure (such as total East Coast Region demand) that depends on measures associated with members in lower levels of a hierarchy (such as the individual stores). Similarly, one or more application servers 130 may disaggregate measures when, for example, one or more planners 120 modifies the value of a measure associated with a member at one level of a hierarchy (such as the total demand for the East Coast Region) and the modified value requires measures associated with members at a lower level in the hierarchy to be modified based on the hierarchical relationship (such as changing prices at the individual store level to match the modified total demand).

In addition, or as an alternative, one or more data nodes 140 may also use the exemplary hierarchy to determine how to shard data across one or more data nodes 140. A single data node 140 of the one or more data nodes 140 may store a shard of data associated with only a single region, such as the East Coast region. According to embodiments, the shard of data on that data node 140 comprises all the facts associated with the East Coast region. Data associated with other regions, such as for example, the Midwest Region, West Coast Region, and the South Region may each be stored on different data nodes 140. Although, in this example, each region is stored on a different data node 140, embodiments contemplate any suitable selection or storage of data on any subset of data nodes 140, including all data nodes 140 or a single data node 140 according to particular needs.

Returning back to FIG. 2 and to further illustrate the relationship between facts, measures, and dimension, an example is now given. Continuing with the national retailer example given above, a fact, stored on one or more data nodes 140, may comprise "A quantity of 30 #10 screws was sold on week 4 of 2016 at Store #1234 for $3.00." Measures associated with this fact are the quantity of screws (30) and the price ($3.00). Dimensions that may be assigned to this fact include: time (week 4 of 2016), product (#10 screws), and geography (store #1234). Although a particular example of measures, dimensions, and facts are given; embodiments contemplate any suitable value, attribute, or combination of values and attributes, according to particular needs.

In addition, or as an alternative, each measure may have as many or as few dimensions according to particular needs. For example, one or more supply chain entities 160 associated with distributed network 100 may only consider time and product dimensions, but not a geography dimension in connection with its data usage. This might be the case when products are ordered using the Internet or the telephone and then distributed from a single distribution center. Other possible scenarios involving more or fewer than three dimensions will be apparent to those skilled in the art. For example, instead of or in addition to a geography dimension, data may have a location dimension, a store dimension, or an outlet dimension used to organize the various physical locations where products might be sold. As further examples, data might include a supplier dimension or a customer dimension. Data may have any number of dimensions according to particular needs.

In the three-dimensional example above, having time, product and geography dimensions, the values of the measures may depend on the combined positions of members within each of the time, product, and geography dimensions. As a result, the values of the measures typically vary with these combined positions as appropriate to accurately reflect the sales, demand, available supply, selling price, or other data associated with these members. Other suitable dimensions may replace or be combined with the time, product, and geography dimensions, according to particular needs.

In one embodiment, one or more data nodes 140 receives measures from one or more data sources that are internal, external, or both internal and external to one or more planners 120, database 150, or one or more supply chain entities 160. For example, the measures received from sources internal to a manufacturing or warehousing facility may include unit shipping data, dollar shipping data, inventory data, pricing data, and any other suitable information. While measures received from external sources, such as from syndicated partners of an enterprise or facility, may include point-of-sale data, demographic data, and any other suitable information. In addition, or as an alternative, other data that may be stored at one or more data nodes 140a-140n include planning data such as, for example, plans, forecasts, projections, or the like. In addition, the amount of data for each of these types of exemplary data is typically too large to be stored on a single server. Other considerations, as discussed herein, may militate against storing data on a single server. Therefore, embodiments shard data across many of the one or more data nodes 140 and each shard is associated with a member or collection of members of a dimension associated with measures in the sharded data.

Even though the data is stored across many of the one or more data nodes 140*a*-140*n* in the distributed horizontally-scalable network 110, one or more planners 120*a*-120*n* may still need to access and modify the data simultaneously. This may happen, for example, when the data is stored hierarchically, and the one or more planners 120*a*-120*n* modify a fact that is related to another fact higher or lower in the hierarchy. For example, sales of products in a particular geographic region may reflect sales for the products in a particular territory in the region. Because of these hierarchical dependencies, the data concerning various products or other items may be stored hierarchically or derived in a hierarchical fashion.

Figure 4:
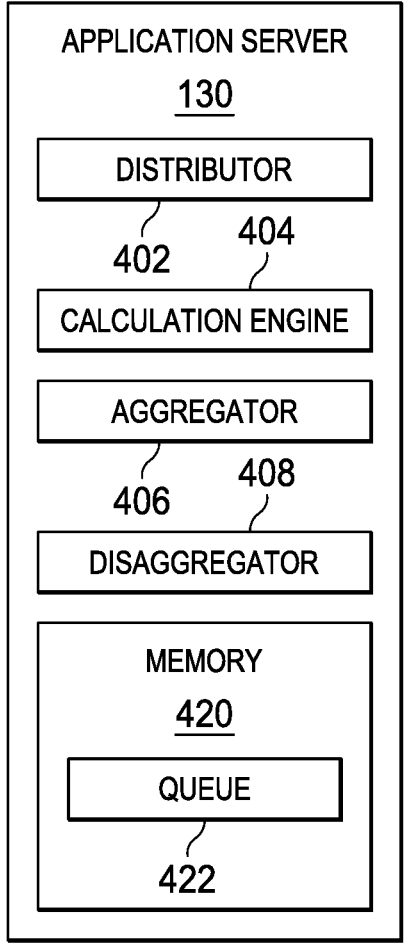
FIG. 4 illustrates the one or more application servers of FIG. 1 in greater detail in accordance with an embodiment.

FIG. 4 illustrates the one or more application servers 130 of FIG. 1 in greater detail in accordance with an embodiment. As discussed above, one or more application servers 130 may comprise one or more computers at one or more locations including associated input devices, output devices, non-transitory computer-readable storage media, processors, memory, or other components for receiving, processing, storing, and communicating information according to the operation of the distributed network 100. In addition, and as discussed in more detail below, one or more application servers 130 comprise a distributor 402, calculation engine 404, aggregator 406, disaggregator 408, queue 422, and memory 420. Although one or more application servers 130 are shown and described as each comprising a single distributor 402, calculation engine 404, aggregator 406, disaggregator 408, queue 422, and memory 420; embodiments contemplate any suitable number of distributors, calculation engines, aggregators, disaggregators, queues, and memory, according to particular needs.

According to some embodiments, distributor 402 sends requests to one or more data nodes 140 to execute processes to perform aggregation, disaggregation, and calculation in response to one or more planners 120 editing measures stored in shards at the one or more data nodes 140, as explained in more detail below. According to embodiments, distributor 402 comprises a remote procedure call that provides for one or more application servers 130 to make simultaneous calls to sub-routines of one or more data nodes 140. As the responses to one or more data nodes 140 are returned, distributor 402 combines the responses, which may include only partial results to an aggregation or disaggregation request, based on the data stored on one or more data nodes 140. In the case of a calculation request, only the fact that it has been completed is returned, and in this case, when all the one or more data nodes 140 have responded, the distributed calculation request is considered complete by one or more application servers 130. In the case of aggregation and disaggregation requests, the partial results from each of the one or more data node 140 are merged on the requesting application server 130, such that after all of the one or more data nodes 140 have responded, a complete aggregation is now available on the application server. In the case of a distributed aggregation request, the merged results may then be sent from one or more application servers 130 to one or more planners 120 to complete the request.

According to embodiments, the combination of partial results comprises a single merged result, such as, for example, a sum, as explained in more detail below. However, from one or more planners 120 point of view, it appears as a single virtual server completed the request, rather than the response being based on the combination of multiple data nodes 140. In the final case of the distributed disaggregation request, the aggregated partial results are similarly merged until all of the one or more data nodes 140 have responded, at which time the values are accurately aggregated over data from all of the one or more data nodes 140. The fully aggregated results are then sent to each of the one or more data nodes 140 along with the value to disaggregate, in order to complete the disaggregation. Each of the one or more data nodes 140 then performs its portion of the disaggregation and reports back a successful conclusion. When all of the one or more data nodes 140 report that the stored values have been altered according to the requirements of the distributed disaggregation request, such request is considered to be concluded.

In one embodiment, one or more application servers 130 initiates other processes while waiting for the partial results from each of the one or more data nodes 140. When distributor 402 receives a partial result from the last node 140 to which a request was sent, distributor 402 initiates a process to begin combining the partial results received from the one or more data nodes 140. In addition, or as an alternative, distributor 402 begins combining the partial results received from the one or more data nodes 140 when each partial result is returned. One or more application servers 130 combines the partial results received from the one or more data nodes 140 in order to generate a response to one or more planners 120. As an example only and not by way of limitation, one type of request sent from one or more planners 120 may be for a sum of measures stored on the one or more data nodes 140, such as, for example, daily sales. After one or more planners 120 sends a request to one or more application servers 130 to perform a sum of daily sales, one or more application servers 130 sends a request to the one or more data nodes 140 to perform a sum on the daily sales measures stored in the shard in each of the one or more data nodes 140. Then, each of the one or more data nodes 140 performs a sum of the daily sales measures stored on that node 140 and sends the results to the one or more application servers 130. One or more application servers 130 may then need to combine the sums (partial results) to arrive at the total daily sales.

In addition, or as an alternative, any sums containing data that is duplicated on more than one data node 140 is not counted twice. In addition, one or more data nodes 140 may not have any data that relates to the request being sent by distributor 402. Distributor 402 may receive an indication from one or more data nodes 140 indicating that no data is available or that the one or more data nodes 140 is unable to perform the request.

Calculation engine 404 may perform a calculation on the shards of data stored at one or more data nodes 140 in response to one or more measures edited by one or more planners 120. According to embodiments, measures stored in shards at the one or more data nodes 140 are associated measure properties, which may include, for example, data type, aggregation type, and other information. Calculation engine 404 may use the aggregation type information to determine which type of aggregator or disaggregator to use for that measure. In addition, the measures may be associated with a measure model that comprises one or more rule sets. These rule sets may comprise one or more formulas that define an invariant relationship between two or more of the measures.

As an example only and not by way of limitation, a simple exemplary formula of a rule set may comprise REVENUE=PRICE*DEMAND. Based on this exemplary formula, any edit to the measures affecting revenue, price, or demand may alter the other measures based on the relationship expressed by the formula. In addition, or as an alternative, each rule set may comprise more than one formula, where all formulas in the rule set define an invariant relationship among all of the measures that appear in each formula of the rule set. Each rule set may also comprise a flexibility parameter. A flexibility parameter may comprise an ordered list of one or more measures that the rule set is authorized to calculate in the event that one of the measures is edited by the user.

Continuing with the above exemplary formula of (REVENUE=PRICE*DEMAND), flexibility parameters may comprise {REVENUE, DEMAND}. According to this exemplary flexibility parameter syntax, revenue and demand are flexible, and, because revenue is indicated before demand, revenue is the preferred measure for calculation engine 404 to calculate. The flexibility parameters indicate those measures that calculation engine 404 will edit based on a user edit to one or more measures that are related by the rule sets.

In addition, calculation engine 404 may perform a calculation to maintain the invariant relationships established by a measure model in response to one or more edited measures. Calculation engine 404 may work in connection with distributor 402 to send requests to one or more data nodes 140 to perform calculations on the data present on each data node 140. Each of these calculations may be referred to as a "partial calculation." based on edited measures that affect data on the one or more data nodes 140. For example, after a disaggregation is performed by disaggregator 408 (as explained in more detail below), one or more changed values may be spread to one or more data nodes 140. In response, the one or more data nodes 140 may perform a calculation to ensure that a measure model remains intact based on changed values.

Furthermore, calculation engine 404 may store a queue of pending edits in queue 422, such that when an edit is made by one or more planners 120, the planner 120 automatically generates a signal to one or more application servers 130 to append the edit to the queue 422, which are tracked separately for each session. In response to receiving a signal from one or more planners 120 to perform a calculation, calculation engine 404 may process the queue 422 to determine, based on the particular calculation to be performed, what edits must be processed against the particular data to be modified.

When a request to perform a calculation is received by a data node 140, the data node 140 may divide the set of altered members for which a calculation is needed into disjoint subsets, each of which constitutes a calculation task. Calculations for the same position but different time members may be allocated to the same task so that time-dependent calculations such as calculating a running total over time by adding and subtracting values while carrying the result forward to the next time period may be performed in time order, as may be required by the dependencies of such a calculation. According to embodiments, the tasks are submitted to a queue which is serviced by worker threads. According to embodiments, the data nodes 140 comprise enough worker threads to keep all cores of the one or more processors busy, so that the calculations may be performed in parallel, even within a single data node 140 because there are no dependencies between the calculations performed by different tasks. Calculations may also take place in parallel to the extent that data requiring calculation is located on various data nodes 140 and all data nodes 140*a-n* receive the request to perform the calculation in parallel from distributor 402.

To further explain the operation of calculation engine 404, several examples are now given. In a first example, one or more planners 120 may be used for supply chain management, such as retail planning.

Referring to FIG. 2 in a distributed horizontally-scalable network 110 a retail planning example may comprise multiple planners 120*a*-120*n* (commonly as many as fifty) that simultaneously edit and manipulate hundreds of millions of facts about price, margin, cost, revenue, units, and other like retail planning data. In response to the multiple planners 120*a*-120*n* editing a value, distributed horizontally-scalable network 110 may perform an aggregation, disaggregation, or calculation to update values of measures in the one or more data nodes 140*a*-140*n*. The updated values of measures may then be used to solve a retail planning problem.

As an example only and not by way of limitation, a particular retail planning problem may comprise determining how many days of coverage are needed for a particular product at a particular retail store based on a determined demand. According to embodiments, one or more planners 120*a*-120*n* performing retail planning initiates a request to one or more application servers 130 to determine the number of days of coverage for the selected product and retail store by sending simultaneous requests to all data nodes 140*a*-140*n* to calculate the days of coverage. Each of the data nodes 140*a*-140*n* may perform a calculation, and send the calculation to one or more application servers 130, which may then compute the days of coverage from the calculations received from the one or more data nodes 140*a*-140*n*.

In addition, or as an alternative, for a coverage calculation, in the case that the calculation is performed as part of a calculation sequence and the data required is present in each data node 140, the calculation may be performed on each data node 140. Frequently, however, the coverage calculation is performed for the purposes of populating a pivot grid using aggregated data. According to this embodiment, application server 130 may request all aggregations required to perform the coverage calculation via the distributor 402 of the one or more data nodes 140, and, after combining the partial results, application server 130 may then use the combined partial results to perform the coverage calculation.

As another example, one or more planners 120*a*-120*n* may also be used to solve a supply chain master planning problem. For example, one or more planners 120*a*-120*n* may model one or more supply chain master planning problems of one or more supply chain entities 160 in a supply chain network to represent the flow of materials through supply chain entities 160 and solve the master planning problem to generate a supply chain plan. In an embodiment, one or more planners 120*a*-120*n* stores and retrieves supply chain master planning problem data, such as, for example, Linear Programming (LP) optimized plans of a supply chain network.

In an inventory optimization for a supply chain planning example, one or more planners 120*a*-120*n* may determine an optimal inventory based on, for example, the mean time between stock-outs and/or the customer service level requirement for various products. As described in more detail below, one or more server processes of one or more application servers 130 may send simultaneous requests to one or more data nodes 140*a*-140*n* to perform a calculation to determine the mean time between stock-outs or the customer service level requirements based on, for example, historical sales data stored on the one or more data nodes 140a-140n. Each of the one or more data nodes 140a-140n may then access data stored on itself in a shard of the total data, perform a partial calculation, and then send the calculation to one or more application servers 130, along with any other data necessary to complete the calculation. One of the server processes of one or more application servers 130 may then determine the mean time between stock outs or the customer service level requirements, which may then be sent to one or more planners 120a-120n, which then may then determine an optimal inventory based, at least in part, on the mean time between stock outs or the customer service level requirements received from the one or more application servers 130.

In another example and similar to the supply chain planning example, one or more planners 120a-120n may be used in utility planning. For example, a utility planner 120a-120n may initiate a request to an application server 130 to determine the number of substations needed to properly distribute a utility (such as water, electricity, natural gas, or the like). One or more application servers 130 may simultaneously send a request to all of the data nodes 140a-140n to aggregate data on utility use so that one or more planners 120a-120n may make a determination on the number of substations that will fully distribute the utility. Although particular examples are given, embodiments contemplate one or more planners 120a-120n requesting any type of planning determinations from one or more application servers 130, according to particular needs.

According to embodiments, aggregator 406 may perform aggregations in a single round-trip by initiating each of the one or more data nodes 140a-140n to aggregate only the portion of the sharded data resident on that particular data node 140 in distributed horizontally-scalable network 110. This may be followed by the merging of partial results into a single, combined result by distributor 402. Distributor 402 may rely on aggregator 406 to perform aggregation by obtaining values at a higher level or lower dimensionality (see FIG. 2) than the values are sharded at the one or more data nodes 140a-140n by summing values or combining values based on a formula in the measure model. According to embodiments, the combining of partial results is triggered by the distributor 402 when it receives a reply from each node 140, but the logic to perform the combining is located in aggregator 406. Additionally, the logic required to perform aggregation or disaggregation may be present on all data nodes 140 and the application server 130.

According to embodiments, application server 130 sends requests for aggregation or disaggregation through distributor 402, which distributes requests in parallel to one or more (or all) data nodes 140. When a data node 140 has no data to contribute to the request, it may return empty partial results.

To further explain aggregation of aggregator 406, an example is now given with reference to the distributed horizontally-scalable network 110 of FIG. 2. In the following example, aggregator 406 may use one or more aggregation types, such as, summation aggregation, formula aggregation, relative aggregation, relative-delta aggregation, opening aggregation, closing aggregation, and like aggregations. In addition, aggregator 406 may perform aggregation-types that provide any statistic on a set of values, such as for example, calculating the standard deviation, averaging, weighted averaging, and the like.

According to embodiments, each aggregation-type is performed by an aggregator 406 specific to the aggregation-type. Although aggregator 406 is described herein as performing a particular aggregation, embodiments contemplate that the aggregation logic that performs the aggregation is an aggregator that is specific for the required aggregation-type. The aggregation logic in the specific aggregator-type may also be responsible for the combining of partial results, because the combining of partial results may also be dependent on the aggregation-type being performed.

Continuing with the aggregation example, aggregator 406 may use a summation-type aggregation, to sum a collection of values stored on one or more data nodes 140a-140n, such as the total units sold in a selected subset of stores. As explained in more detail below, each of one or more data nodes 140a-140n comprises a shard of the total data. In one embodiment, each shard may comprise data associated with a single store. When one or more planners 120a-120n edit a measure or requests a value that is dependent on the total units in more than one store, aggregator 406 may initiate a summation-type aggregation to sum the total units held in two or more shards, that is two or more data nodes 140, containing the number of units sold for the selected stores. In other words, aggregator 406 uses a summation-type aggregation to aggregate by adding the values, and, when a measure describing unit sales is stored in an intersection defined by unit and location, and the units are desired to be shown by category and region, then all the values for locations in that region and units in that category may be added together.

Aggregator 406 may also use a formula-type aggregation which may comprise a multiple step process for performing an aggregation that incorporates a formula to aggregate one or more measures. A measure whose aggregation type is declared to be a formula-type aggregation, will be assigned a formula selected from a rule set in the measure model. This formula will be applied to determine aggregated values of this measure, by computing this formula based on similarly aggregated values of the related measures that appear in the formula, each of which is aggregated by means specified by its own aggregation type. When aggregator 406 performs a formula-type aggregation on the measure associated with the formula-type aggregation, aggregator 406 first aggregates all measures in the formula, which are not the measure associated with the formula-type aggregation, according to the aggregation types associated with those measures up to the level desired. Aggregator 406 may then apply the formula to the measure associated with the formula-type aggregation based on the aggregated other measures.

By way of a simple formula-type aggregation example, assume a formula expressed in the measure model is PRICE=REVENUE/UNITS, revenue and units are a summation-type aggregation, and price is a formula-type aggregation, aggregator 406 aggregates by a summation-type aggregation revenue and units, and then perform a formula-type aggregation to price by dividing the aggregated revenue by the aggregated units, which then may provide a weighted average price weighted by the units sold.

Aggregator 406 may also use opening-type and closing-type aggregations which may comprise summing measures that represent a running total. Because a running total comprises a summation of all numbers included in its total, adding weekly values may not necessarily be used to determine a monthly value. Therefore, in opening-type and closing-type aggregations, a time dimension may be treated differently from other dimensions associated with measures. In dimensions other than a time dimension, an opening-type and closing-type aggregation may aggregate as explained in connection with summation-type aggregation. For a time dimension, however, an opening-type aggregation only the first member in an aggregated period is used to provide a value for an aggregation, and in a closing-type aggregation, only the last member in an aggregated period is used to provide a value for an aggregation.

According to other embodiments, aggregator 406 creates any type of aggregation according to particular needs. Aggregator 406 may comprise a framework for writing an aggregation, including handling the distributed nature of aggregation across data nodes 140a-140n and an interface for a method call that is supplied when distributor 402 combines the partial results from one or more data nodes 140a-140n into a single result provided by one or more application servers 130.

Disaggregator 408 may perform disaggregation, or spreading, by propagating changed values to a level lower than an edited measure so that the changed values, if aggregated, would result in the edited measure. For example, when one or more planners 120a-120n edit an aggregated value, the new value may be disaggregated down to the level where the measures are stored. In addition, or as an alternative, disaggregator 408 may perform disaggregation by one or more actions. Even without multiple data nodes 140a-n, the process of disaggregation may comprise a two action process. At a first action, values may aggregated to calculate the previous value for any cell that is to be disaggregated with a new value. Secondly, the new value may be disaggregated so that the aggregation changes from the old value to the new value.

However, when multiple data nodes 140a-n are present, embodiments of disaggregation comprise a coordinating action between aggregation and disaggregation. For example, at a first action of multiple node disaggregation, an application server 130 may send a distributed request to one or more (or all) data nodes 140a-n to aggregate a measure to a particular cell. Each of the one or more data nodes 140a-n honors this request by performing an aggregation of all the data that is a component of this aggregation and that is present on that particular data node 140. This action may comprise spreading values based on the categorization of the values, as explained below. At a second action, each of the one or more data nodes 140a-n returns a result and stores a copy of (or a reference to) the aggregator used, such that the aggregator-type is known to the one or more data nodes 140a-n during disaggregation.

At a third action, application server 130 may merge the partial aggregations to compute a complete aggregation, as each of the one or more data nodes 140a-n returns a result. At a fourth action, when the last partial aggregation is received by application server 130, the distributor 402 sends a second distributed request to the one or more data nodes 140a-n to perform their portion of the disaggregation. The second distributed request may also supply the merged aggregation, so the effects upon aggregation of any data that exists on other data nodes 140a-n is passed to each of the one or more nodes 140a-n. At a fifth action, each of the one or more nodes 140a-n uses the data that node 140 collected during the aggregation phase together with the total values merged from each of the one or more nodes 140a-n to determine how to alter the values located on the node 140.

To further describe the first action of multiple node disaggregation, an explanation of spreading is now given. At the first action, the set of component values that aggregate to a desired target are aggregated and classified into various categories.

Values lying outside this set are not considered. The component values may be categorized as:

Category 1 value: Valid value, not locked or changed;

Category 2 value: Missing value, not locked;

Category 3 value: Valid value, changed, but not locked; and

Category 4 value: Valid value, locked.

In the above categories, "changed" indicates the value has already been disaggregated to a lower level of disaggregation during a calculation operation. Because a planner 120 user may enter multiple edits during planning, a parent and child value may be edited. According to embodiments, the child value is disaggregated first, as recorded as an operation in queue 422.

In a first case, the disaggregator may perform proportional spreading. If there are Category 1 values that sum to a non-zero value, the Category 1 values participate in the disaggregation, and all other categories do not participate, and thus are not altered during the disaggregation phase, which follows. A ratio may be used to disaggregate. Nominally, the new value is divided by the aggregated value, but since some values that are included in the aggregation may not participate in the disaggregation (because the values are, for example, locked or changed) the ratio may be calculated by subtracting the sum of the non-participating members from both the numerator and denominator before dividing.

In a second case, if Category 1 values are present but sum to 0 (such as, for example, because all the Category 1 values are 0), the disaggregator may perform "singular" spreading, in which the Category 1 values are treated as if they are all equal to value of one and spread to equal values that sum to the aggregated value, minus the sum of the locked values. In a third case, the disaggregator may perform singular spreading of missing values. If no Category 1 values are present, but Category 2 values are present, then the Category 2 values participate in singular spreading, as described above.

In a fourth case, the disaggregator may perform overdetermined spreading. If no Category 1 or Category 2 values are present, but Category 3 values are present, then the changed values participate as Category 1 values. In a fifth case, the disaggregator may determine that spreading is not allowed. If no Category 1, 2, or 3 values are present, then spreading is not allowed.

After the spreading is performed as described, the one or more data nodes 140a-n generate separate counts of values found in Categories 1, 2, and 3, and the separate sums of the values in Categories 1, 3, and 4. The counts and sums may then be combined by the disaggregator 408 under the direction of the distributor 402 on the application server 130 before the application server 130 transmits the merged aggregated values to each of the one or more nodes 140a-n by distributor 402. The merged values may then be used to determine which case of spreading to perform, and to compute the proper ratio. These depend on values aggregated from each of the one or more nodes 140a-n and combined, but the combined values must be applied on each node 140a-n before disaggregation can be completed.

During the disaggregation process, when values that have been entered into queue 422 are disaggregated to the child members as stored on the one or more data nodes 140a-n, each data node 140 makes a note of the altered positions. Relying on each data node 140a-n to remember which positions have been altered provides each data node 140a-n a way to determine which member combinations require a calculation when a distributed call is made to trigger the calculation. This information is tracked on each data node 140, in a separate object for each session, and, according to embodiments, is not sent back to application server 130. Application server 130 may subsequently request one or more calculations to be performed for the session, due to the relationships described by rule sets in the measure model. Each of these calculations will find the altered positions for this session, and perform the calculation action only on those positions marked as having sustained a change. This information is retained for the duration of the calculation operation. During the calculation operation, between requests to calculate each required rule, additional disaggregation requests may be performed. These requests may add more altered positions to the collection and thus affect subsequent calculation requests that occur during this session's calculation operation.

To further explain disaggregation of disaggregator 408, an example is now given with reference to the distributed horizontally-scalable network 110 of FIG. 2. In the following example, disaggregator 408 may be of one or more disaggregation types, such as, summation disaggregation, formula disaggregation, relative disaggregation, relative-delta disaggregation, opening disaggregation, closing disaggregation, and like disaggregations. In addition, disaggregator 408 may perform disaggregation-types that provide any statistic on a set of values, such as for example, calculating the standard deviation, averaging, weighted averaging, and the like.

For a summation-type disaggregation, disaggregator 408 may disaggregate values differently based on the type of data initially present and whether the stored data is prevented from being changed. For example, when data that contributed to an original aggregated value before the value was edited, and this data is changeable, this data participates in the disaggregation in proportion to its original value. When some of the data that contributed to the aggregation is not changeable, then that data may be left unchanged, and only the changeable stored data participates proportionally, once the unchangeable data is subtracted out from the old and new values of the aggregated number. When data originally sums to 0, or no data is present, then the changeable data may all be changed to the same value.

For a formula-type disaggregation, disaggregator 408 may reverse a calculation performed when aggregating, by a process that may comprise the following actions. At a first action, the new value may be plugged into an inverse of the aggregation rule to calculate one of the other measures in a rule at the aggregated level. At a second action, this new value may then be disaggregated to the stored level. At a third action, all of the detailed values changed by this disaggregation may be used to back-calculate the detailed values at the stored level of the formula-type measure again using the aggregation rule. This may alter the weighted average without destroying the relative sizes of the weights of its components.

For a relative-type measure, aggregation may be performed similarly to a summation-type aggregation, but instead of disaggregating proportionally based on the values used in the aggregation, disaggregator 408 disaggregates proportionally the changed value based on the values of a specified reference measure.

For a relative-type disaggregation, the stored values for the measure being disaggregated may not be consulted during disaggregation, since only the values in the reference measure are consulted. For a relative-delta-type disaggregation, both measures may be used, and only the difference between the original aggregated value and the new value are computed proportionally. For relative-delta-type disaggregation, the detailed values are set to the original detailed value plus the difference between the values distributed proportionally to the reference measure. Note that the difference may be negative when a smaller value is used than the originally aggregated value.

According to embodiments, aggregator 406 and disaggregator 408 may be initiated by calculation engine 404 to perform a calculation function initiated by one or more planners 120a-120n. For example, in response to receiving an indication to calculate a value by one or more planners 120a-120n, one or more application servers 130 may initiate aggregator 406 and disaggregator 408 to process the calculation initiated by calculation engine 404. More particularly, when one or more planners 120a-120n changes a value and initiates a calculation, disaggregator 408 may propagate the change in value to the data stored on one or more data nodes 140, and then calculation engine may initiate the one or more data nodes 140a-140n to perform a calculation using the changed values.

As an example only and not by way of limitation, assuming that one or more planners 120a-120n set sales (such as, for example, dollar sales) for a particular region, or another member of a dimension relating to the data, to be 10% higher than the current values. In response to setting the sales 10% higher and initiating the calculation engine 404, disaggregator 408 first propagates new values for unit sales (or units) to one or more data nodes 140a-140n. Each of the one or more data nodes 140a-140n sets new values for units in order to maintain the invariant measure with sales set 10% higher. For each class that sales were set 10% higher, the change will spread to each lower class and at the individual leaf level. After disaggregator 408 indicates that all values for each data node 140a-140n has been changed, calculation engine 404 sends a signal to the one or more data nodes 140a-140n to perform a calculation based on the changed values.

According to embodiments, one or more queues 422 may comprise a queue of pending edits made by one or more planners 120a-120n. As described in more detail below, queue 422 may store pending edits, such that when an edit is made at one or more planners 120a-120n, the planner 120 automatically generates a signal to one or more application servers 130 to append the edit to queue 422, which is tracked separately for each user or session. In response to receiving a signal from the planner 120 to perform a calculation, calculation engine 124 may process the register of pending edits to determine, based on the particular calculation to be performed, what edits must be processed against the particular data to be modified. According to embodiments, each queue 422 records the pending edits from a single planner 120.

Figure 5:
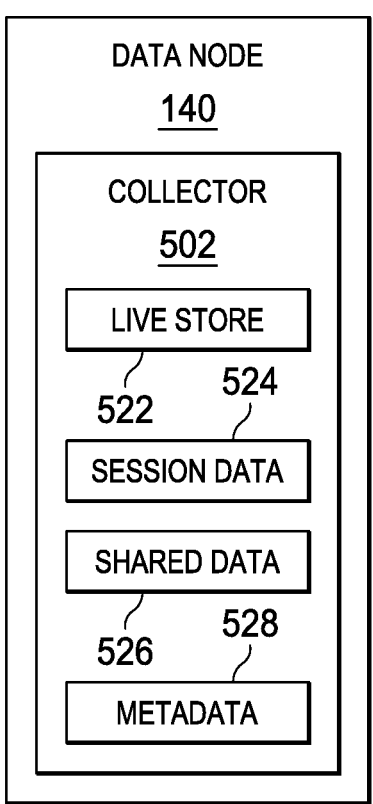
FIG. 5 illustrates the one or more data nodes of FIG. 1 in greater detail in accordance with an embodiment.

FIG. 5 illustrates the one or more data nodes 140 of FIG. 1 in greater detail in accordance with an embodiment. As discussed above, one or more data nodes 140 may comprise one or more computers at one or more locations including associated input devices, output devices, non-transitory computer-readable storage media, processors, memory, or other components for receiving, processing, storing, and communicating information according to the operation of the distributed network 100. In addition, and as discussed in more detail below, one or more data nodes 140 comprises collector 502. Collector 502 comprises live store data 522, session data 524, shared data 526, and metadata 528. Although one or more data nodes 140 is shown and described as comprising a single collector 502, live store data 522, session data 524, shared data 526, and metadata 528; embodiments contemplate any suitable number of collectors and memory, according to particular needs.

Collector 502 may comprise an object that stores data 522-526 and metadata 528. Metadata 528 may comprise dimensions and intersections. Dimensions may comprise hierarchies and hierarchy levels. Hierarchy levels may comprise members and may comprise attribute values for those members. Intersections may be associated with a set of hierarchy levels from some of the dimensions, and contain members representing combinations of members from the related hierarchy levels. Intersections may also comprise live store data 522. The session data 524 and shared data 526 may be associated with the live store data 522.

According to embodiments, data may be duplicated on more than one of the one or more data nodes 140. If data is duplicated on multiple data nodes 140*a-n*, all except exactly one copy of the data may be marked as a duplicate so that it is not counted twice during calculations. For example, when a measure is stored at a higher level, then the measure is stored in a different intersection, as explained above. To use that measure in a rule with measures stored at a lower level, the upper level value may be inherited to the lower level so that the rule may be applied at the lower level. When this is possible, the sharding strategies of the two intersections must be aligned. If a value is stored at the lower level on a data node 140, then the value for the corresponding higher level member must also be available on that data node 140. However, more than one lower level member may correspond to the higher level member, and not all of the lower level members that correspond may be located on the same data node 140. If not, the upper level member may require being duplicated on each data node 140 for which a corresponding lower level member is present.

If data is duplicated, all copies except one are marked as duplicates so that any attempt to aggregate them that is not idempotent will properly ignore the duplicates. According to embodiments, disaggregation changes all participating values, including those marked as duplicates in order to maintain their status as duplicates. Live store data 522 may comprise any data in any suitable data structure. Data may be stored at any suitable level of granularity, such as, for example, different levels in the product hierarchy.

Initially, when one or more planners 120 makes a change to live store data 522, the changes are stored as session data 524. Session data 524 may be associated with a particular planner 120 or a particular user and may represent data that that is only accessible to that particular planner 120 or user and may comprise any changes or edits to the live store data 522. When one or more planners 120 edits data, the planner 120 may then aggregate, change the orientation of the aggregations, and/or aggregate in a different way and get different totals, but the aggregations are based on the session data 524 representing the edits made by the planner 120. According to embodiments, session data 524 may only be accessed by the particular planner 120 or user that made the particular edits.

According to further embodiments, one or more data nodes 140 may store shared data 526. After one or more planners 120 edits the data and the data is stored as session data 524, the planner 120 may select an option to share the session data 524 with other planners 120. For example, one planner 120 may choose to share session data 524 with another planner 120. Planner 120 may indicate to one or more application servers 130 that any edits made to the session data 524 are to be shared with one or more other planners 120. Each planner may be indicated by, for example, a number, name, or other identifier that provides for a first planner 120 to indicate which other planners 120 that session data 524 is to be shared. In response to receiving an indication to share session data 524, one or more data nodes 140 stores session data 524 as shared data 526. One or more data nodes 140 may store session data 524 as shared data 526 by modifying any associated metadata 528 to indicate that permission to access session data 524 is given to all of the one or more planners 120 identified by the creator of the session data 524. According to other embodiments, one or more application servers 130 moves session data 524 to a different location in a memory or database of one or more data nodes 140 where it may be accessed by any of the one or more planners 120. Even while shared data 524 is not accessible to the one or more planners 120, live store data 522 may still be accessible to other planners 120. Embodiments also contemplate, storing different versions of shared data 526. Each version of shared data 526 may be termed a scenario and represent different "what-if" scenarios that are being planned by one or more planners 120.

According to some embodiments, shared data 526 comprises a hierarchy of incremental scenarios that provides one or more planners 120 to make modifications to selected portions of the data and commit those changes back to a base scenario or discard the changes. The one or more scenarios created may also be persisted for later use. Metadata 528 may describe permissions, access control, authorship information, member information, and parent-child relationship, and the like. Metadata 528 may be sharded across more than one node 140. Meta-data 528 may describe permissions, access control, authorship information, member information, and parent-child relationship, and the like.

For example, in a demand planning example, live store data 522 may comprise a demand forecast and historical sales for all products at all locations sharded across one or more data nodes 140. However, according to embodiments, authorization requirements may be associated with particular attributes, such as product, location, or the like, such that a first planner 120 has access to only a particular subset of the sharded data and a second planner 120 has access to a different subset of the sharded data. For example, a first planner 120 may have authorization requirements that provide access to only demand forecast and historical sales data for the West Coast Region, while another planner 120 has access to a Midwest Region. By way of a further example, a first planner 120 may have access to data relating only to clothing products, while a second planner 120 may have access to data relating only to electronics products. Although particular examples are provided, embodiments contemplate authorization provided to various planners 120 based on any suitable partitioning of data. The authorization may include determining what the one or more planners 120 have permission to read and/or write to the sharded data.

In order to support one or more application servers 130 clustering (multiple application servers 130 in front of data nodes 140), metadata 528 is stored on the one or more data nodes 140 instead of the one or more application servers 130. For example, because each of the one or more planners 120 may access any one of the one or more application servers 130, metadata 528 is stored on the one or more data nodes 140 and may be duplicated to facilitate metadata 528 being associated with any data accessed by the one or more planners 120. In addition, or as an alternative, metadata 528, including member information and parent-child relationships, may also be divided into shards. When metadata is required in more than one shard, it may be replicated such as when data for one class is on one data node 140 and data for another class is on another data node 140, but both classes belong to the same department then the department metadata 528 will be replicated on both data nodes 140.

Figure 6:
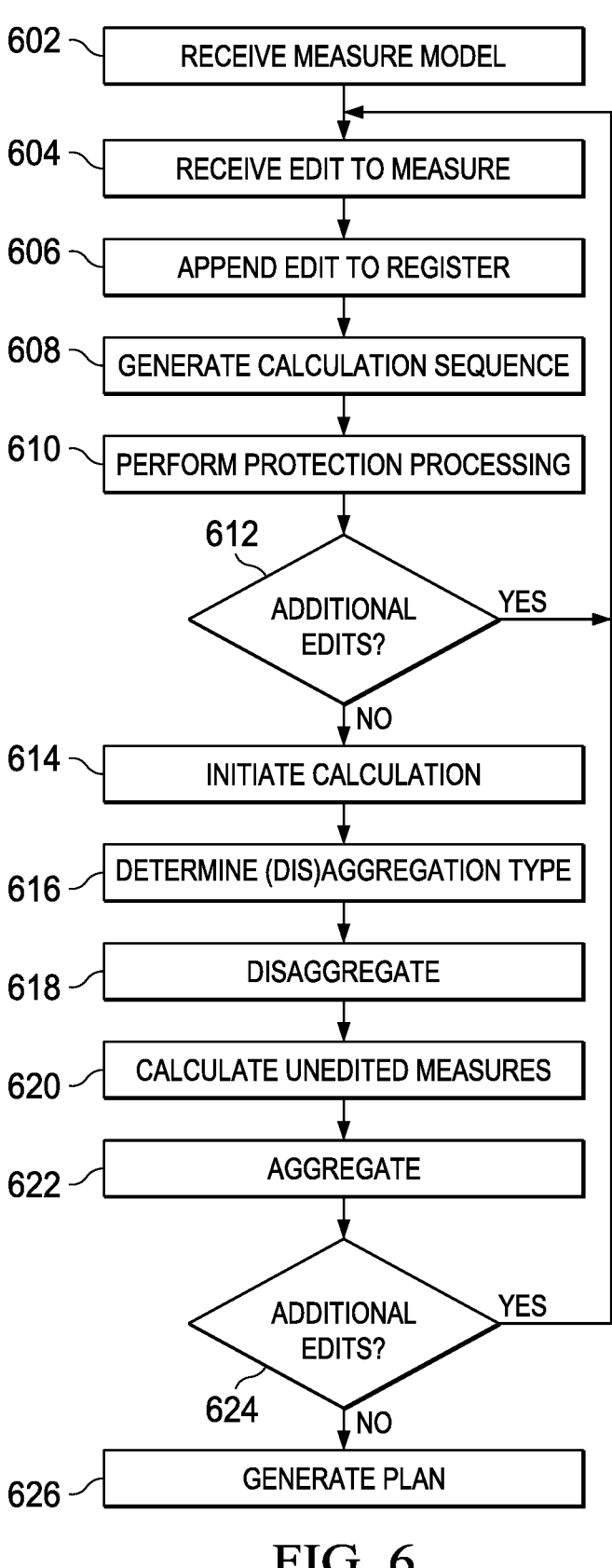
FIG. 6 illustrates an exemplary method for editing measures by the calculation engine according to an embodiment.

FIG. 6 illustrates an exemplary method 600 for editing measures by the calculation engine 404 according to an embodiment. The process of editing measures proceeds by one or more activities, which although described in a particular order may be performed in one or more permutations, according to particular needs.

Method 600 is given with reference to the distributed horizontally-scalable network 110 of FIG. 2 and begins at action 602 where calculation engine 404 of one or more application servers 130 receives a measure model. A measure model may comprise one or more measures and one or more rule sets. The one or more measures received by calculation engine 404 may include various measure properties, including, for example, data type, aggregation type. Calculation engine 404 may use the aggregation type to determine which type of aggregator or disaggregator to use for that particular measure.

According to embodiments, the one or more rule sets may comprise one or more formulas that define an invariant relationship between two or more of the measures. As an example only and not by way of limitation, a simple formula of a rule set may comprise REVENUE=PRICE*DEMAND. Based on this formula, any edit to the measures affecting revenue, price, or demand may alter the other measures based on the relationship expressed by the exemplary formula, subject to other constraints, as explained in more detail below. Each rule set may comprise more than one formula, where all formulas in the rule set define an invariant relationship among all of the measures that appear in each formula of the rule set. Each rule set may also comprise a flexibility parameter. A flexibility parameter may comprise an ordered list of one or more measures that the rule set is authorized to calculate in the event that one of the measures is edited by the one or more planners 120*a*-120*n*.

For example, continuing with the above simple formula (REVENUE=PRICE*DEMAND), flexibility parameters may comprise {REVENUE, DEMAND}. According to this exemplary flexibility parameter syntax, revenue and demand are flexible, and, because revenue is indicated before demand, revenue is the preferred measure for calculation engine 404 to calculate. The flexibility parameters indicate a priority of choice for calculation engine 404 to calculate and uses the order in which the measures appears in the flexibility parameters as a preference input, to assist in the determination of which of those measures that calculation engine 404 will edit based on an edit by one or more planners 120*a*-120*n* to one or more measures that are related by the rule sets.

At action 604, calculation engine 404 may receive an edit to a first measure from one or more planners 120*a*-120*n*. An edit may comprise, for example, one or more planners 120*a*-120*n* setting a new value for a measure by one or more planning application and transmittal of the changed value to calculation engine 404 of one or more application servers 130. In the above example, any edits to the revenue, price, or demand measures may be sent to the calculation engine 404 by one or more planners 120.

At action 606, calculation engine 404 may append the edit to queue 422 to one of application servers 130. One or more queues 422 may comprise a database of all edits made to the current set of measures that are being edited by one or more planners 120*a*-120*n* in a particular session. Queue 422 may segregate particular edits based on criteria, such as the type of data being modified, the planner 120 that modifies the data, or other considerations. Each edit stored in queue 422 may be considered a pending edit, and each edit is pending until a calculation is performed with the edit or the edit is undone. For example, and with reference to the above simple formula, if revenue, price, or demand is edited at action 604, that edit would be sent to calculation engine 404 to be stored on queue 422.

At action 608, calculation engine 404 may generate a calculation sequence. Each measure that has a pending edit may be used to determine a calculation sequence. The calculation sequence may be an ordered list of rules, taken from the one or more rule sets, which ensures that, after applying the ordered list of rules in a particular sequence, the measures will remain in compliance with the invariant relationships described by each rule in the one or more rule sets. According to embodiments, calculation engine 404 determines the calculation sequence by, at least in part, inverting one or more relationships in a rule set to obtain a new relationship. For example, DEMAND=REVENUE/PRICE could be obtained by inverting the exemplary rule set above (REVENUE=PRICE*DEMAND).

According to embodiments, the calculation sequence obeys all of the following restrictions:

1. If any measure is edited, then that measure will NOT be calculated by a rule in the calculation sequence. This restriction may be termed: USER-WINS. This restriction provides that the calculation engine 404 may not alter measures that have already been edited.

2. Every rule set that contains one or more measures either edited or calculated by a rule in the calculation sequence from another rule set, will contribute exactly one rule to the calculation sequence. This restriction may be termed: COMPLETENESS. This restriction provides that all rule sets may be honored after a calculation is performed by calculation engine 404.

3. The rules will be ordered so that the measure calculated by any rule will not be used in a rule that appears earlier in the sequence. This restriction may be termed: WELL-ORDERED. This restriction provides for the calculation engine 404 to not use a stale value in the calculation, but will instead always calculate a value before it is then used.

At action 610, calculation engine 404 may perform protection processing. Protection processing may comprise locking edits to measures at one or more planners 120 so that a measure may not be edited in a way such that no calculation sequence may be generated. According to some embodiments, it is not possible for calculation engine 404 to generate a calculation sequence for particular edits to one or more measures or a particular one or more rule sets. This may happen when changes are made to all of the active measures in some rule set, which causes there to be no active measure that calculation engine 404 may choose to calculate. It may also happen when no rules may be selected from several rule sets to simultaneously meet all three of the restrictions of a valid calculation sequence.

According to embodiments, protection processing comprises testing each measure that the user could edit, one-by-one, to see if a calculation sequence could be generated if that measure was added to the edited set. If not, the tested measure is protected from editing. For example, in a pivot table embodiment, the measure may be presented to a user in a read-only protected style until either a calculation is performed or some other measure is removed from the edited set, by performing an undo operation. This anticipatory nature of protection processing thereby ensures that the user is never allowed to make an edit to a measure that would render the calculation sequence generator unable to succeed once the edit is made.

By way of example, consider a measure model with only one rule set, the rule set provided in the example above (REVENUE=PRICE*DEMAND). In this example, if one or more planners 120a-120n edited revenue, calculation engine 404 may test each editable measure not already edited by the user (price and demand). If the one or more planners 120a-120n had edited revenue and calculation engine 404 tested demand, a calculation sequence could not be generated, because the flexibility of the above rule set does not allow for calculation engine 404 to calculate price, so therefore demand will be protected. However, if price was included in the flexibility parameters provided above, so that price would be calculated by calculation engine 404 for this rule set, then when the planner 120 edited only demand, calculation engine 404 would not protect revenue.

At action 612, calculation engine 404 checks if edits are being made to one or more additional measures. If an additional edit is made to one or more measures, method 600 returns to action 604 and calculation engine 404 receives a second edit to one or more measures. For each additional edit that is made or undone, calculation engine 404 may add each edit or remove an edit to queue 422 at action 606. Each time an edit is made or undone, calculation engine 404 may generate a new calculation sequence at action 608 and perform protection processing at action 610. If no further edit is made to measures, as determined by the user pressing the calculate button, method 600 continues to action 614 and a calculation may be initiated by calculation engine 404.

At action 614, calculation engine 404 may initiate a calculation for one or more pending edits stored in queue 422. Calculation engine 404 may initiate a calculation in response to a user indication to begin a calculation, or calculation engine 404 may initiate a calculation automatically based on preset criteria, such as a particular number of edits to measures, an edit to a particular preselected measure, at a particular time interval, at a particular time, or any other like criteria.

As an example only and not by way of limitation, assume that the measures received at action 602 are revenue, price, and demand, the rule set received is REVENUE=PRICE*DEMAND, and the flexibility parameters are {REVENUE, DEMAND}. The flexibility parameters indicate that revenue or demand will be calculated if revenue, price, or demand is edited and revenue is the preferred measure for the calculation engine to calculate. The flexibility parameters indicate, not only the order that measures are chosen to be calculated (in this example, revenue, then demand), but also those measures that calculation engine 404 will calculate based on a user edit to one or more measures that are related by the rule set. Revenue, price, and demand all appear in the rule set, but only revenue and demand appear in the flexibility. This means that calculation engine 404 may only calculate values for revenue and demand, but not price. Therefore, if the one or more planners 120a-120n edits demand, calculation engine 404 will calculate a new value for revenue, and, if the planner 120 edits revenue, calculation engine 404 will calculate a new demand value. If one or more planners 120a-120n edits price, calculation engine 404 will calculate a new value for revenue, because it has priority in the flexibility. If the one or more planners 120a-120n edits price and revenue, calculation engine 404 may calculate a new value for demand. However, calculation engine 404 will not use this rule set to calculate price, because price does not appear in the flexibility parameters. This flexibility may not prevent a planner 120 from editing price, but may indicate only that this particular rule set will not be used in calculating price.

At action 616, calculation engine 404 may determine the aggregation-type and disaggregation type associated with each measure that is changed. As discussed above, each measure may be associated with an aggregation type, which may rely on one or more values or other measures. Calculation engine 404 may determine the aggregation-type and disaggregation-type associated with each measure and uses the aggregation-type and disaggregation-type to determine the correct aggregator 406 and disaggregator 408, respectively. At action 618, calculation engine 404 calls disaggregator 408 to disaggregate any necessary measures or values based on the determined disaggregation-type. At this action, edits made at an aggregated level (i.e. above the level in the hierarchy where the data is stored) are disaggregated or spread down to the level where the data is stored.

At action 620, calculation engine 404 calculates measures by performing a sequence of calculations to calculate the value of the measures that one or more planners 120a-120n has not edited, so that all of the desired invariant relationships between measures are maintained, as defined in the measure model. At action 622, calculation engine 404 calls aggregator 406 to aggregate all or a subset of the measures, at levels where the measures are not stored, by aggregating the stored values. At action 624, if an additional edit is made to one or more measures, the method 600 returns to action 604 and calculation engine 404 receives a further edit to one or more measures. If no further edit is made to measures, the method 600 continues to action 626.

At action 626, one or more planners 120a-120n may generate a plan based on the results generated by editing measures. As discussed above, these one or more plans may comprise a production plan, supply chain plan, inventory optimization plan, utility plan, or the like. In order to further illustrate the method 600, several further examples are now given. For the following examples, at action 602, calculation engine 404 receives four rules, four flexibility parameters, and seven measures as follows:

$$T = A + B + C\{T, A, B, C :\}$$
$$APCT = A\%T\{APCT, A, T :\}$$
$$BPCT = B\%T\{BPCT, B, T :\}$$
$$CPCT = C\%T\{CPCT.C, T :\}$$

where, A, B, and C represent components of the total, T, and measures, APCT, BPCT, and CPCT, represent the percentage of A of T, B of T, and C of T respectively. In this example, the operator % may represent "taking the percentage of," so that A % T indicates (A*100)/T. The flexibilities of each rule set show all measures are active because each measure is represented in the flexibility parameters following each rule in which the measure appears.

In a first example based on the above exemplary measures, rules, and flexibility parameters, calculation engine 404 may receive an edit to measure A, at action 604. This edit may be appended to the queue 422 at action 606, and the calculation engine 404 may generate a calculation sequence at action 608. The calculation sequence may be generated as follows:

$$T = A + B + C$$
$$APCT = A\%T$$
$$BPCT = B\%T$$
$$CPCT = C\%T$$

Here, calculation engine 404 did not need to calculate measures B and C, but did need to calculate T and APCT, and because T changed, calculation engine 404 needed to calculate BPCT and CPCT, as well.

For a second example, if instead of receiving an edit to A at action 604, calculation engine 404 received an edit to measure T, then measure T would be appended to queue 422 at action 606, and the calculation sequence generated at action 608 may be generated as follows:

$$A = T - B - C$$
$$APCT = A\%T$$
$$BPCT = B\%T$$
$$CPCT = C\%T$$

This calculation sequence is similar to the previous example, but the first rule has been inverted. Calculation engine 404 has a multipath feature, where the direction of calculation may be altered, reversed, or inverted by editing a different measure. Even though T was edited by the one or more planners 120a-120n, rather than by the calculation sequence, BPCT and CPCT still will need to be recalculated and are thus added to the calculation sequence.

In a third example based on the above exemplary measures, rules, and flexibility parameters, calculation engine 404 may receive edits to measures A and T, at action 604. These edits may be appended to the queue 422 at action 606, and the calculation engine 404 may generate a calculation sequence at action 608. The calculation sequence may be generated as follows:

$$B = T - A - C$$
$$APCT = A\%T$$
$$BPCT = B\%T$$
$$CPCT = C\%T$$

This calculation sequence demonstrates that a different inversion and a different direction for the first calculation (B=T−A−C) was needed for this calculation sequence based on the edits to both measures A and T.

In a fourth example based on the above exemplary measures, rules, and flexibility parameters, calculation engine 404 may receive an edit to measure APCT, at action 604. This edit may be appended to the queue 422 at action 606, and the calculation engine 404 may generate a calculation sequence at action 608. The calculation sequence may be generated as follows:

$$A = APCT @ T$$
$$B = T - A - C$$
$$BPCT = B\%T$$

In this calculation sequence, it is first noted that the operator "@" represents the inverse of the operator "%" (as discussed above), and is equivalent to APCT*T/100. This calculation sequence demonstrates that calculation engine 404 resisted changing T based on the edit to APCT. Instead, the calculation engine 404 chose to calculate B so that T could remain unchanged as A was changed. This occurred despite T appearing first in the flexibility of the rule set, before B. This happens because, if the calculation engine 404 tried to calculate both T=A+B+C and A=T@APCT, both rules cannot both be present in the same calculation sequence because they could not be put in a correct order according to dependency. In one rule A is dependent on T and in the second rule T is dependent on A. In this case, because the calculation engine 404 may only produce a correctly ordered calculation sequence of rules, the calculation engine 404 may select another rule from one of the rule sets when a circular dependency situation arises.

In a fifth example based on the above exemplary measures, rules, and flexibility parameters, calculation engine 404 may receive edits to measures A and APCT, at action 604. These edits may be appended to the queue 422 at action 606, and the calculation engine 404 may generate a calculation sequence at action 608. The calculation sequence may be generated as follows:

$$T = A\%APCT$$
$$B = T - A - C$$
$$BPCT = B\%T$$
$$CPCT = C\%T$$

This calculation sequence demonstrates that a different calculation sequence was generated based on the edits to both measures A and APCT.

In a sixth example based on the above exemplary measures, rules, and flexibility parameters, calculation engine 404 may receive edits to measures APCT, BPCT, and CPCT, at action 604. These edits may be appended to the queue 422 at action 606, and the calculation engine 404 may generate a calculation sequence at action 608. In this example, no calculation sequence could be generated that meets all the requirements. Therefore, if any two of these measures were edited, protection processing would ensure that the third would be protected from editing by the user, at action 610.

In each of the above examples, the method continues to action 612, and if no additional edits were made, method 600 would continue through the following actions, as described above.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system comprising:

a distributed computer network comprising one or more application servers and one or more data nodes, wherein the one or more data nodes each comprises a data shard representing one or more objects and one or more measures related to the one or more objects, the one or more application servers is configured to:

receive a measure model wherein the measure model comprises one or more rules, one or more measures, and one or more flexibility parameters, wherein a measure comprises one or more properties of data on which a calculation may be made, and further wherein each measure of the one or more measures has associated measure properties, the measure properties comprising a data type and an aggregation type, wherein the one or more rules further comprise one or more formulas that define a relationship between two or more measures, wherein the one or more flexibility parameters comprise an ordered list of one or more measures in a rule, the one or more measures authorized to be calculated in an event the one or more measures in the rule are edited, and wherein the measure model establishes invariant relationships;

receive an edit to a measure of the one or more measures, wherein the received edit is an update to the measure of the one or more measures;

append the edit to one or more queues, wherein the one or more queues comprise a database of edits;

generate a calculation sequence based on the one or more rules;

disaggregate one or more values to the shard of data on the one or more data nodes based, at least in part, on the edited measure, wherein a type of disaggregator used to disaggregate the one or more values is based, at least in part, on a measure property associated with the edited measure; and calculate one or more unedited measures based on the disaggregation, wherein the application server performs protection processing when a calculation sequence is not able to be generated based on one or more edited measures and the one or more flexibility parameters and wherein the protection processing comprises testing each measure that could be edited to determine if the calculation sequence could be generated, wherein calculating the one or more unedited measures further comprises performing a sequence of calculations to calculate a value of the one or more unedited measures, so that all desired invariant relationships between measures are maintained, as defined in the measure model; and wherein the one or more application servers generate the calculation sequence by:

avoiding any rule of the one or more rules that calculates an edited measure;

contributing exactly one rule to the calculation sequence from the one or more rules that comprises any measure edited or calculated by a rule in the calculation sequence; and ordering rules of the calculation sequence so that any measure calculated by a first rule of the calculation sequence will not be used in a second rule of the calculation sequence that appears earlier in the sequence.

2. The system of claim 1, wherein disaggregation comprises spreading edits made above a level in a hierarchy where the data shard is stored in the one or more data nodes to a level where the data shard is stored in the one or more data nodes.

3. The system of claim 2, wherein the one or more application servers is further configured to:

aggregate a subset of the measures at levels where a subset of measures are not stored.

4. A method comprising:

receiving a measure model over a computer network from one or more data nodes in a distributed computer network, each of the one or more data nodes comprises a data shard representing one or more objects and one or more measures related to the one or more objects, wherein the measure model comprises one or more rules, one or more measures, and one or more flexibility parameters, wherein a measure comprises one or more properties of data on which a calculation may be made, and further wherein each measure of the one or more measures has associated measure properties, the measure properties comprising a data type and an aggregation type, wherein the one or more rules further comprise one or more formulas that define a relationship between two or more measures, wherein the one or more flexibility parameters comprise an ordered list of one or more measures in a rule, the one or more measures authorized to be calculated in an event the one or more measures in the rule are edited, and wherein the measure model establishes invariant relationships;

receiving an edit to a measure of the one or more measures, wherein the received edit is an update to the measure of the one or more measures;

appending the edit to one or more queues using one or more application servers comprising a processor, wherein the one or more queues comprise a database of edits;

generating a calculation sequence based on the one or more rules using the one or more application servers;

disaggregating, using the one or more application servers, one or more values to the shard of data on the one or more data nodes based, at least in part, on the edited measure, wherein a type of disaggregator used to disaggregate the one or more values is based, at least in part, on a measure property associated with the edited measure; and calculating, using the one or more application servers, one or more unedited measures based on the disaggregation, wherein when a calculation sequence is not able to be generated based on one or more edited measures and the one or more flexibility parameters, performing protection processing comprising testing each measure that could be edited to determine if the calculation sequence could be generated, wherein calculating the one or more unedited measures further comprises performing a sequence of calculations to calculate a value of the measures that a user has not edited, so that all of desired invariant relationships between measures are maintained, as defined in the measure model; wherein generating the calculation sequence further comprises:

eliminating any rule of the one or more rules that calculates an edited measure;

contributing exactly one rule to the calculation sequence from the one or more rules that comprises any measure edited or calculated by a rule in the calculation sequence; and ordering rules of the calculation sequence so that a measure calculated by a first rule of the calculation sequence will not be used in a second rule of the calculation sequence that appears earlier in the sequence.

5. The method of claim 4, wherein disaggregation comprises spreading edits made above a level in a hierarchy where the data shard is stored in the one or more data nodes to a level where the data shard is stored in the one or more data nodes.

6. The method of claim 5, further comprising:

aggregating a subset of the measures at levels where a subset of measures are not stored.

7. A non-transitory computer-readable medium embodied with software, the software when executed configured to:

receive a measure model over a computer network from one or more data nodes in a distributed computer network, each of the one or more data nodes comprises a data shard representing one or more objects and one or more measures related to the one or more objects, wherein the measure model comprises one or more rules, one or more measures, and one or more flexibility parameters, wherein a measure comprises one or more properties of data on which a calculation may be made, and further wherein each measure of the one or more measures has associated measure properties, the measure properties comprising a data type and an aggregation type, wherein the one or more rules further comprise one or more formulas that define a relationship between two or more measures, wherein the one or more flexibility parameters comprise an ordered list of one or more measures in a rule, the one or more measures authorized to be calculated in an event the one or more measures in the rule are edited, and wherein the measure model establishes invariant relationships;

receive an edit to a measure of the one or more measures, wherein the received edit is an update to the measure of the one or more measures;

append the edit to one or more queues, the one or more queues comprising a database of edits;

generate a calculation sequence based on the one or more rules;

disaggregate one or more values to the shard of data on the one or more data nodes based, at least in part, on the edited measure, wherein a type of disaggregator used to disaggregate the one or more values is based, at least in part, on a measure property associated with the edited measure;

calculate one or more unedited measures based on the disaggregation, wherein when a calculation sequence is not able to be generated based on one or more edited measures and the one or more flexibility parameters, perform protection processing comprising testing each measure that could be edited to determine if the calculation sequence could be generated, wherein calculating the one or more unedited measures further comprises performing a sequence of calculations to calculate a value of the measures that a user has not edited, so that all of desired invariant relationships between measures are maintained, as defined in the measure model;

eliminate any rule of the one or more rules that calculates an edited measure;

contribute exactly one rule to the calculation sequence from the one or more rules that comprises any measure edited or calculated by a rule in the calculation sequence; and order rules of the calculation sequence so that a measure calculated by a first rule of the calculation sequence will not be used in a second rule of the calculation sequence that appears earlier in the sequence.

8. The non-transitory computer-readable medium of claim 7, wherein disaggregation comprises spreading edits made above a level in a hierarchy where the data shard is stored in the one or more data nodes to a level where the data shard is stored in the one or more data nodes.

9. The non-transitory computer-readable medium of claim 8, wherein the software is further configured to:

aggregate a subset of the measures at levels where the subset of measures are not stored.

* * * * *